(12) United States Patent
Zucholl

(10) Patent No.: US 6,383,375 B1
(45) Date of Patent: May 7, 2002

(54) WATER CONTAINER WITH FILTER CARTRIDGE

(75) Inventor: Klaus Zucholl, Mannheim (DE)

(73) Assignee: Aquis Wasser-Luft-Systeme GmbH, Lindau Zweigniederlassung Rebstein, Rebstein (CH)

(*) Notice: Subject to any disclaimer, the term of this patent is extended or adjusted under 35 U.S.C. 154(b) by 0 days.

(21) Appl. No.: 09/462,210
(22) PCT Filed: Jul. 3, 1998
(86) PCT No.: PCT/DE98/01842
§ 371 Date: Jul. 18, 2000
§ 102(e) Date: Jul. 18, 2000
(87) PCT Pub. No.: WO99/01220
PCT Pub. Date: Jan. 14, 1999

(30) Foreign Application Priority Data

Jul. 4, 1997 (DE) .......................... 197 28 631

(51) Int. Cl.[7] .................. B01D 24/38; B01D 35/027
(52) U.S. Cl. .................. 210/172; 210/232; 210/238; 210/282; 210/288; 210/416.3; 222/189.06
(58) Field of Search .................. 210/171, 172, 210/232, 238, 252, 258, 259, 266, 282, 288, 416.3, 501, 502.1, 503; 222/189.06, 189.08

(56) References Cited

U.S. PATENT DOCUMENTS

| 3,167,399 A | * | 1/1965 | Hansen, Jr. |
| 3,746,171 A | * | 7/1973 | Thomsen |
| 4,147,631 A | | 4/1979 | Deines et al. |
| 4,504,389 A | * | 3/1985 | Rundzaitis |
| 4,623,467 A | * | 11/1986 | Hamlin |
| 4,626,350 A | * | 12/1986 | Reid |
| 4,814,078 A | | 3/1989 | Stern et al. |
| 5,112,477 A | * | 5/1992 | Hamlin |
| 5,114,570 A | * | 5/1992 | Nelson et al. |
| 5,753,118 A | * | 5/1998 | Yang |
| 5,833,850 A | * | 11/1998 | Liu |

FOREIGN PATENT DOCUMENTS

| GB | 1 159 078 | 7/1969 |
| GB | 35 22 966 | 10/1986 |

* cited by examiner

Primary Examiner—Duane Smith
Assistant Examiner—Fred Prince
(74) Attorney, Agent, or Firm—Crowell & Moring LLP

(57) ABSTRACT

A water tank is proposed with a filter cartridge especially for use in automatic vending machines in which the risk of contamination and bed compaction of the filter bed are reduced or avoided. This is accomplished according to the invention by the water inlet opening of filter cartridge being located at the bottom, with a passageway provided for the water to pass through filter cartridge upward and a descending drop line to guide the water to drain of water tank, located at the bottom.

16 Claims, 2 Drawing Sheets

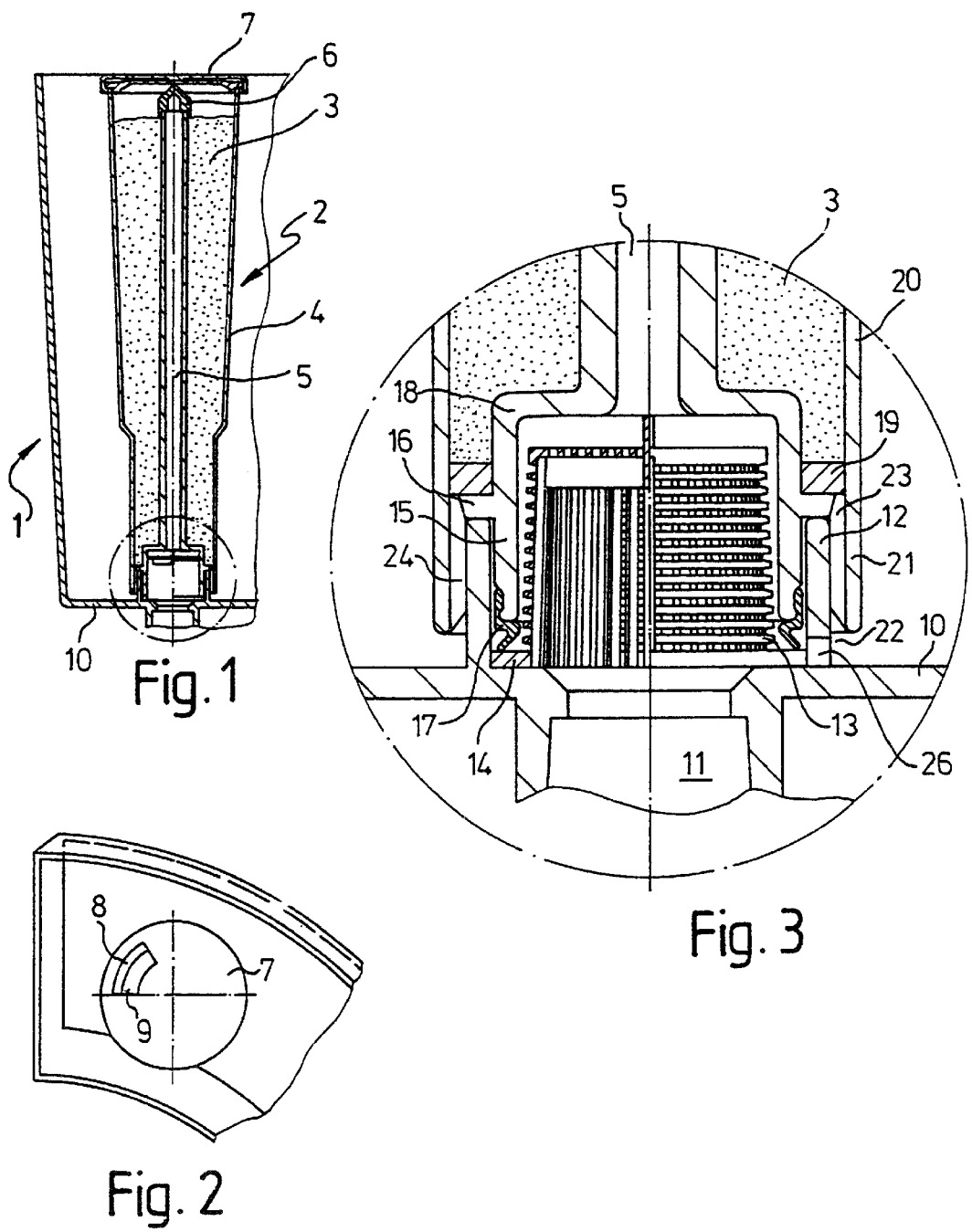

WATER CONTAINER WITH FILTER CARTRIDGE

BACKGROUND AND SUMMARY OF THE INVENTION

The invention relates to a water tank with a filter cartridge.

In beverage vending machines, especially in coffee and tea machines, water treatment is frequently provided using a water filter. An integrated mixture of activated charcoal and ion exchanger is provided in a filter cartridge, said mixture removing odor and taste, heavy metals, organic impurities, and suspended materials (particles), and possibly reducing the hardness of the water.

Known beverage vending machines use replaceable filter cartridges located in the preparation process for beverages outside the water tank. A device suitable for this purpose is described by British Patent 1 159 078-B. The disadvantage of this device is the high cost of replacing the cartridges, especially loosening and restoring the water-conducting connection, with the risk of a leak or the large amount of space taken up by the housing and connections. There is an increased risk of contamination due to the plurality of sealing and screwing connections as well as gaps in the housing.

In addition, filter cartridges for water filter cans are described in DE 35 22 966.7. These cans as a rule consist of an untreated water tank with an outlet at the bottom for filter cartridges, the filter cartridge itself, as well as the treated water tank. These devices however are impractical because of the separate water treatment step, the filter bed can dry out, and because of the operation involving downward flow, there is the danger of compaction of the bed and formation of channels in the filter bed. The filter cartridges cannot be inserted directly in the water tank of a beverage vending machine.

In U.S. Pat. No. 4 814 078 and in U.S. Pat. No. 4 147 631, filter inserts are proposed for connection to a closed liquid circuit. In automatic beverage vending machines with a water tank, such filter cartridges can therefore be inserted only outside the water tank, for which reason the water circuit must be opened to change the cartridge.

The invention on the other hand has the goal of proposing a water tank with a filter cartridge in which simple installation of the filter is possible.

The measures described herein make advantageous embodiments and improvements on the invention possible.

Accordingly, a water tank according to the invention is provided with a filter cartridge inside the water tank, with a water inlet opening for the filter cartridges located at the bottom and a passageway for the water moving upward through the filter cartridge, is provided. In addition, a descending drop line to guide the water to a drain connection located at the bottom of the water tank is provided. As a result, the water flows through the filter cartridge in a so-called upward flow principle. The filter mixture, which consists in known fashion of activated charcoal and ion exchangers; is suspended during operation, preventing compaction of the filter bed.

By virtue of its location inside the tank, the risk of a leak is minor so that simple sealing means can be used. With the aid of the drop line that terminates at the bottom of the filter cartridge, the connection to the drain line of the tank can be created in simple fashion.

Because the lower water inlet opening is open to the outside when the filter cartridge is connected, the cartridge does not have to be connected when the filter cartridge is placed in the water tank. This considerably simplifies the installation of the filter cartridge since only the connection on the outflow side need be made.

Advantageously, the descending drop line is located inside the filter cartridge. Thus, the bottom connection of the filter cartridge can be made centrally with the inlet openings to the filter cartridge in any position being made further outward, preferably annularly, and distributed.

In one advantageous embodiment of the invention, retaining elements project upward from the bottom of the tank to hold the filter cartridge. The filter cartridge can be mounted on such retaining elements with no depressions in the bottom at all, in which depressions stagnant water can collect even when the tank has been drained.

Locking elements of the filter cartridge can engage such retaining elements so that the filter cartridge is held in the water tank by a shapewise fit. By attaching the filter cartridge to the bottom of the water tank in the immediate vicinity of the drain connection, other holding devices, for example those mounted laterally on the water tank, can be eliminated. When the filter cartridge is removed, the water tank is freely accessible for cleaning or other activities.

In one advantageous embodiment of the invention, the retaining elements on the bottom of the water tank have holes. This allows the water to be drawn off even without a filter cartridge, with water entering directly into the drain of the tank bottom through these holes. Accordingly, the holes in the retaining elements on the tank bottom should be located as close as possible to the bottom level in order to permit draining the water tank as completely as possible during operation without filter cartridges.

In one improvement on the invention, the retaining elements are made in the form of an annular plug base. This plug base can be made for example in the form of an annular rib with matching bottom holes or in the form of annular pins. A likewise annular internal collar of the filter cartridge is preferably inserted into this annular arrangement. With the aid of this internal collar which is advantageously provided with a seal as well, the hole intended for filter-free operation and leading to the tank drain can be closed and sealed within the plug-in base during filter operation.

This seal is designed in another advantageous embodiment of the invention as an axial seal that seals off the inner collar from the tank bottom.

If an additional screen to hold back particles, and made of filter material for example in the drain area of the drop line in a special embodiment, this can be secured for example by a matching disk-shaped collar projecting inward between this axial seal and the tank bottom and held in place by pushing the filter cartridge over the inner collar and the axial seal on the tank bottom.

In an improvement on the invention, an outer annular external collar is also provided on the filter cartridge that externally surrounds the plug base. As a result, it is possible that the actual filter bed begins in the radial direction, projecting over the plug base above the plug base, ensuring that the suction height of the water is deep. A deep suction height is necessary in order to drain the water tank as completely as possible during filter operation.

For this purpose, the outer collar can have for example matching holes near the bottom or can terminate at a certain distance from the tank bottom. In the latter case, a suction gap is left open along the entire circumference of the external collar through which gap the tank is drained during filter operation.

For a specific adjustment of this suction gap, it is recommended to provide a stop to limit the insertion depth of the filter cartridge onto the plug base. This stop for example can be in the form of a projection extending radially from the inner collar and striking the plug base.

The outer collar can also be provided with clamping elements by means of which it can be locked to the plug base. Such clamping elements can be made for example in the form of clamping ribs so that the water drawn in can reach the filter bed between the clamping ribs.

As mentioned above, a filter mixture of activated charcoal and possibly ion exchange resin is preferably used. In order to hold this filter mixture in the area provided for it in the filter cartridge, a barrier made of porous filter layers, for example porous polyethylene, is preferably provided. However, other mechanical retaining systems, matching screen inserts for example, can be used.

In one particular improvement on the invention, water tanks of different heights can be provided for length compensation when using filter cartridges. Such length compensation can be provided in one especially simple embodiment in the form of an extension rod or an extension tube.

It is especially advantageous to fasten this length compensation to the lid of the filter cartridge. Thus, when a filter cartridge is made for water tanks of different heights, the filter cartridges are always made the same, with a lid with the required length compensation being used. Advantageously, the lid is made replaceable, for example with latching connections. In this case, the length compensation can be performed by pushing on the lid provided with the appropriate length compensation when assembling the filter cartridge.

In another advantageous embodiment of the invention, a device is provided for marking the expiration date of the filter on the filter cartridge. Thus, the filter can be marked when installed in such a way that a visual check at any time will determine whether filter replacement is necessary. Preferably, this date adjustment is mounted on the lid so that by turning the lid the date marking is adjusted. This allows in particular the setting of this date marking by turning the lid by means of the length compensation attached thereto. The adjustment can also be performed easily if the lid of the filter cartridge is located far inside the water tank.

Other measures for marking the date when the filter will have to be changed are possible in the invention, for example with the aid of a water meter that measures the volume flow through the filter.

In another advantageous embodiment of the invention, the filter cartridge is provided with a circumferential taper from top to bottom. Such a design for the filter cartridge facilitates the suspension of the filter mixture and the risk of compaction of the filter bed is further reduced.

BRIEF DESCRIPTION OF THE DRAWINGS

One embodiment of the invention is shown in the drawing and will be described in greater detail below with reference to the figures.

FIG. 1 is a schematic lengthwise section through a filter cartridge in a water tank;

FIG. 2 is a top view of an object according to FIG. 1;

FIG. 3 is a partial enlargement of FIG. 1 in the area where the tank bottom is connected;

DETAILED DESCRIPTION OF THE DRAWINGS

Figure 4:
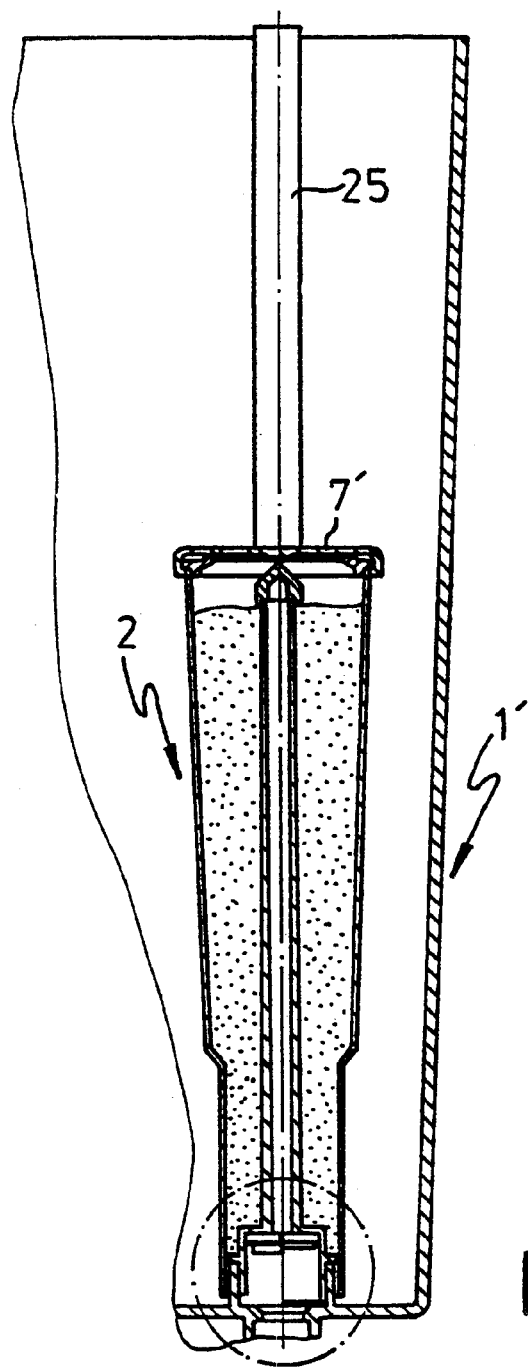
FIG. 4 is a schematic lengthwise section through another embodiment.

Water tank 1 according to FIG. 1 comprises a filter cartridge 2 with a filter mixture 3, made for example of activated charcoal and ion exchange resin. Wall 4 of filter cartridge 2 is made with a cross section that tapers from top to bottom and facilitates the suspension of filter mixture 3. A drop tube 5 is located essentially vertically inside filter cartridge 2 and connected to a filter cap 6 made of porous material, polyethylene for example. The entire filter cartridge 2 is sealed by a lid 7 that has a rotating mechanism not shown in greater detail for marking a date.

It is evident from FIG. 2 that lid 7 includes a window 8 through which a marking disk 9 is visible. By turning lid 7, the marking on marking disk 9 that can be seen in window 8 can be adjusted.

The connection between filter cartridge 2 and tank bottom 10 is especially clear in FIG. 3. On tank bottom 10, a plug base 12 is formed around a drain 11. A mesh insert 13 with an annular collar 14 is inserted inside plug base 12.

Mesh insert 13 is surrounded by an internal collar 15 that has a stop 16 extending radially outward for limiting the depth of penetration. An axial seal 17 is fastened to internal collar 15, in other words it is inserted in a matching shallow annular groove. The axial seal 17 seals inner collar 15 by annular collar 14 from tank bottom 10. Inner collar 15, at its top, blends with drop tube 5 by a shoulder 18.

An annular filter insert 19 can be seen above stop 16, on which insert filter mixture 3 rests.

Circumferential wall 20 blends at its lower extension with an external collar 21 which leaves a suction slot 22 in the area of tank bottom 10 as a result of the insertion depth created by stop 16. The diameter of external collar 21 is dimensioned so that a passageway 23 for filter insert 19 remains open between outer collar 21 and stop 16 projecting radially from the inner collar.

Outer collar 21 is also clamped by clamping ribs 24 to plug-in base 12.

Figure 5:
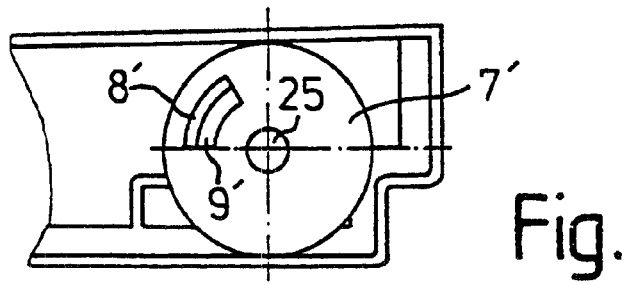
FIG. 5 is a top view of the embodiment according to FIG. 4.

The illustration in FIGS. 4 and 5 essentially corresponds to the subject of FIGS. 1 and 2. However, in this case a water tank 1' with a much greater height is provided. The same filter cartridge 2 as in the above embodiment is used in water tank 1'. Only lid 7' is made differently so that it is provided with a rod extension 25. Since lid 7, 7' is simply fastened to the filter cartridge by a latch, it is particularly simple to mount rod extension 25.

With the aid of rod extension 25, filter cartridge 2 can be introduced simply from above into water tank 1' and placed on plug base 12 and additionally attached at the top, possibly by a matching tank lid not shown in greater detail.

The lid marking can also be operated easily by the rod extension 25, with lid 7' in the present embodiment being rotated until the correct marking on marking disk 9' can be seen in its window 8'.

The function of the device according to the invention is as follows.

The necessary amount of water is drawn out through drain 11 by the associated beverage vending machine. This results in a flow of water from the interior of tank 1 through suction gap 22 between outer collar 21 and tank bottom 10. This water flows inside external collar 21 between clamping ribs 24, upward to filter insert 19 and escapes through the latter.

Filter insert 19, like filter cap 6 which can be made of the same material, serves to keep filter mixture 3 inside filter cartridge 2.

The water drawn in then flows upward through filter mixture 3 and is filtered thereby, and also is softened if ion exchange resin is present.

Through filter cap 6, the water enters drop tube 5 through which it can flow downward where it enters drain 11 through the hole in filter insert 13 and is available for beverage preparation.

In order for the flow process described above to function smoothly, the area inside the outer cap, which is connected by suction gap 22 with the water in tank 1, must be sealed off reliably from drain 11. In this case, this is achieved by axial seal 17 in conjunction with inner collar 15.

It should be mentioned at this point that the plug base 12 advantageously has holes at least in the vicinity of tank bottom 10. Plug base 12 can also consist of individual upwardly projecting ribs since the internal seal is produced by internal collar 15 and axial seal 17.

Plug base 12 must be permeable to water in the vicinity of the tank bottom so that water tank 1 can be used even without filter cartridge 2 and tank 1 can be drained completely. With filter cartridge 2 removed, the water flows from the tank bottom directly through holes 26 into drain 11.

Operation without filter cartridges 2 can be advisable if this is not necessary because of the water quality or if operation with no exchange filter cartridge 2 will not be interrupted, with the particular beverage vending machine being operated temporarily without water treatment.

By means of markings 7, 8, and 9, the date for replacement of filter cartridge 2 can be set easily so that replacement at the proper time is not forgotten.

The filter cartridge described in water tank 1 offers the several advantages outlined above. Filter mixture 3 cannot be compacted since it is regularly suspended by the upward flow of water. Filter cartridge 2 can be used by simply pushing it onto plug base 12 without additional connection. Locating filter cartridge 2 inside water tank 1 makes the entire device insensitive to leakage at the filter connections.

As a result of the drain 11 at the bottom which is made possible by the likewise bottom connection of filter cartridge 2, switching to filterless operation of the beverage vending machine is particularly simple, with the only step necessary being pulling off the filter cartridges 2.

TABLE OF ELEMENTS IN FIGURES

1 Water tank
2 Filter cartridge
3 Filter mixture
4 Wall
5 Drop tube
6 Filter cap
7 Lid
8 Window
9 Marking disk
10 Tank bottom
11 Drain
12 Plug base
13 Mesh insert
14 Ring collar
15 Inner collar
16 Stop
17 Axial seal
18 Shoulder
19 Filter insert
20 Circumferential wall
21 External collar
22 Suction gap
23 Hole
24 Clamping ribs
25 Rod extension
26 Hole

What is claimed is:

1. A water tank system, comprising:
   a water tank having a drain located at a bottom thereof, the drain coupling with a drain line, wherein the water tank is at least partially filled with water when in use;
   a filter cartridge removably located inside the water tank, the filter cartridge including at least one lower water inlet opening immersed in, and open to, the water in the water tank when in use, a passageway for water to flow upward through the filter cartridge, a descending drop line to conduct the water toward the drain, and a connection for tightly connecting the drop line to the drain;
   wherein the filter cartridge is connected to the interior of the water tank such that the connection between the drop line and the drain is located inside the water tank.

2. Water tank according to claim 1, wherein the descending drop line is a riser located inside the filter cartridge.

3. Water tank according to claim 1, wherein a retaining element projecting from the bottom of the tank is provided for holding the filter cartridge.

4. Water tank according to claim 3, wherein the retaining element has holes.

5. Water tank according to claim 1, wherein an internal collar of the filter cartridge is provided to separate the drain from a supply of the filter cartridge.

6. Water tank according to claim 1, wherein a seal is provided on an internal collar.

7. Water tank according to claim 1, wherein an external collar is provided.

8. Water tank according to claim 1, wherein a stop is provided for limiting the depth of penetration of the filter cartridge on a plug base.

9. Water tank according to claim 1, wherein clamping elements are provided for clamping the filter cartridge on a plug base.

10. Water tank according to claim 1, wherein length equalization is provided for water tanks of different heights.

11. Water tank according to claim 10, wherein the length compensation is mounted on a lid of the filter cartridge.

12. Water tank according to claim 11, wherein the lid of the filter cartridge is replaceable.

13. Water tank according to claim 1, wherein the filter cartridge is designed with a cross section that tapers from top to bottom.

14. Filter cartridge characterized in that it is designed according to claim 1.

15. Beverage vending machine, comprising a water tank system, including:
   a water tank having a drain located at a bottom thereof, the drain coupling with a drain line, wherein the water tank is at least partially filled with water when in use;
   a filter cartridge removably located inside the water tank, the filter cartridge including at least one lower water inlet opening immersed in, and open to, the water in the water tank when in use, a passageway for water to flow upward through the filter cartridge, a descending drop line to conduct the water toward the drain, and a connection for tightly connecting the drop line to the drain;
   wherein the filter cartridge is connected to the interior of the water tank such that the connection between the drop line and the drain is located inside the water tank.

16. A water reserve tank having a water reserve at least partially filling the water reserve tank when in operation, with a removable filter cartridge located inside the water reserve tank, with a passageway for water to flow upward through the filter cartridge, a descending drop line to conduct the water to a drain located at a bottom of the water reserve tank, and a connection for tightly connecting the drop line to a drain line, wherein the filter cartridge is connected to the interior of the water reserve tank by at least one open lower water inlet opening so that the connection between the drop line and the drain and the inlet opening are located inside the water reserve tank, and that the inlet opening is in contact with the water reserve.

* * * * *